(12) United States Patent
Okamoto et al.

(10) Patent No.: US 12,103,083 B2
(45) Date of Patent: *Oct. 1, 2024

(54) THREE-DIMENSIONAL SHAPED ARTICLE PRODUCTION METHOD

(71) Applicant: SEIKO EPSON CORPORATION, Tokyo (JP)

(72) Inventors: Eiji Okamoto, Matsumoto (JP); Masaya Ishida, Hara-mura (JP); Hiroshi Wada, Azumino (JP); Toshimitsu Hirai, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 488 days.

This patent is subject to a terminal disclaimer.

(21) Appl. No.: 17/165,069

(22) Filed: Feb. 2, 2021

(65) Prior Publication Data

US 2021/0154891 A1    May 27, 2021

Related U.S. Application Data

(63) Continuation of application No. 15/414,214, filed on Jan. 24, 2017, now abandoned.

(30) Foreign Application Priority Data

Jan. 29, 2016  (JP) .................................. 2016-015321

(51) Int. Cl.
*B33Y 40/00*    (2020.01)
*B22F 7/00*    (2006.01)
(Continued)

(52) U.S. Cl.
CPC .............. *B22F 7/006* (2013.01); *B22F 10/43* (2021.01); *B22F 10/47* (2021.01); *B28B 1/001* (2013.01);
(Continued)

(58) Field of Classification Search
CPC .......... B22F 7/006; B22F 10/43; B22F 10/47; B22F 10/16; B22F 10/60; B22F 12/30;
(Continued)

(56) References Cited

U.S. PATENT DOCUMENTS 5,147,587 A    9/1992  Marcus
5,204,055 A    4/1993  Sachs
(Continued)

FOREIGN PATENT DOCUMENTS

CN    102554234    7/2012
EP    3548213    10/2019
(Continued)

*Primary Examiner* — Jacob T Minskey
*Assistant Examiner* — Caroline Beha
(74) *Attorney, Agent, or Firm* — WORKMAN NYDEGGER

(57) ABSTRACT

A three-dimensional shaped article production method for producing a three-dimensional shaped article by stacking layers to form a stacked body includes a constituent layer formation step of forming a constituent layer which corresponds to a constituent region of the three-dimensional shaped article, a support layer formation step of forming a support layer which is in contact with the constituent layer and supports the constituent layer, and a sintering step of sintering the constituent layer, wherein the support layer is configured such that as compared with the volume decrement accompanying the sintering step of a space surrounded by the constituent layer from at least two directions, the volume decrement accompanying the sintering step of the support layer which supports the constituent layer in the space is larger.

10 Claims, 10 Drawing Sheets

(51) Int. Cl.
| | |
|---|---|
| *B22F 10/16* | (2021.01) |
| *B22F 10/43* | (2021.01) |
| *B22F 10/47* | (2021.01) |
| *B22F 10/60* | (2021.01) |
| *B28B 1/00* | (2006.01) |
| *B29C 35/08* | (2006.01) |
| *B29C 64/40* | (2017.01) |
| *B32B 18/00* | (2006.01) |
| *B33Y 10/00* | (2015.01) |
| *B33Y 80/00* | (2015.01) |
| *B22F 12/30* | (2021.01) |
| *B22F 12/55* | (2021.01) |
| *B29K 105/16* | (2006.01) |

(52) U.S. Cl.
CPC .......... *B29C 35/0805* (2013.01); *B29C 64/40* (2017.08); *B32B 18/00* (2013.01); *B33Y 10/00* (2014.12); *B33Y 40/00* (2014.12); *B33Y 80/00* (2014.12); *B22F 10/16* (2021.01); *B22F 10/60* (2021.01); *B22F 12/30* (2021.01); *B22F 12/55* (2021.01); *B22F 2999/00* (2013.01); *B29C 2035/0838* (2013.01); *B29K 2105/16* (2013.01); *C04B 2235/6026* (2013.01); *C04B 2235/77* (2013.01); *C04B 2235/9615* (2013.01); *C04B 2237/341* (2013.01); *C04B 2237/343* (2013.01); *C04B 2237/346* (2013.01); *C04B 2237/348* (2013.01); *C04B 2237/68* (2013.01); *Y02P 10/25* (2015.11)

(58) Field of Classification Search
CPC ...... B22F 12/55; B22F 2999/00; B28B 1/001; B29C 35/0805; B29C 64/40; B29C 2035/0838; B29C 64/135; B29C 64/165; B29C 64/209; B29C 64/268; B29C 64/321; B32B 18/00; B33Y 10/00; B33Y 40/00; B33Y 80/00; B33Y 30/00; B33Y 70/10; B29K 2105/16; C04B 2235/6026; C04B 2235/77; C04B 2235/9615; C04B 2237/341; C04B 2237/343; C04B 2237/346; C04B 2237/348; C04B 2237/68; Y02P 10/25; B44C 3/02

See application file for complete search history.

(56) References Cited

U.S. PATENT DOCUMENTS

| | | | | |
|---|---|---|---|---|
| 5,263,130 | A | * 11/1993 | Pomerantz | B33Y 50/00 700/145 |
| 5,286,573 | A | * 2/1994 | Prinz | B22F 3/115 428/419 |
| 5,287,435 | A | * 2/1994 | Cohen | B33Y 30/00 425/162 |
| 5,387,380 | A | 2/1995 | Cima | |
| 5,745,834 | A | * 4/1998 | Bampton | B22F 10/34 419/37 |
| 6,066,285 | A | 5/2000 | Kumar | |
| 6,209,420 | B1 | 4/2001 | Butcher | |
| 2002/0062909 | A1 | 5/2002 | Jang et al. | |
| 2002/0171177 | A1 * | 11/2002 | Kritchman | B33Y 70/00 264/401 |
| 2007/0126157 | A1 | 6/2007 | Bredt | |
| 2010/0042241 | A1 * | 2/2010 | Inoue | A61C 13/0004 703/1 |
| 2011/0068517 | A1 | 3/2011 | Maguire | |
| 2011/0285052 | A1 * | 11/2011 | Wigand | B33Y 30/00 264/219 |
| 2012/0041586 | A1 * | 2/2012 | Abe | B22F 10/38 700/120 |

FOREIGN PATENT DOCUMENTS

| | | |
|---|---|---|
| JP | 06-218712 | 8/1994 |
| JP | 2015-081380 | 4/2015 |
| WO | 2018102021 | 6/2018 |

* cited by examiner

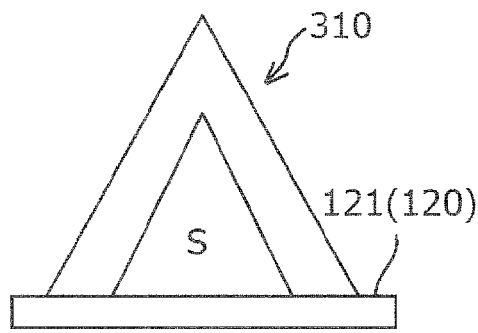
FIG. 9A
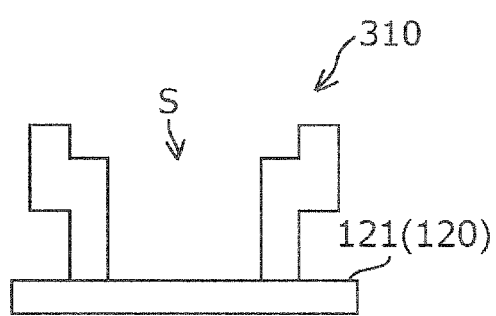
FIG. 9B
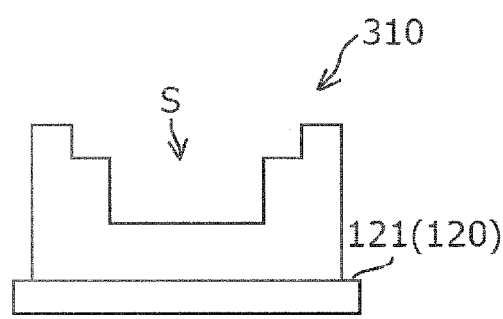
FIG. 9C
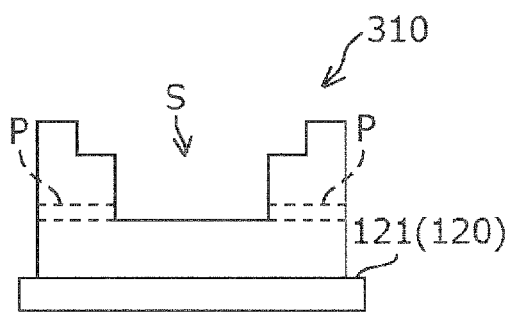
FIG. 9D
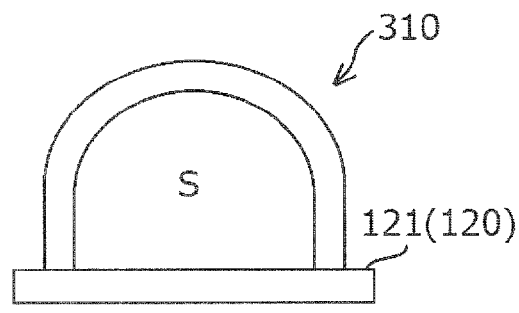
FIG. 9E
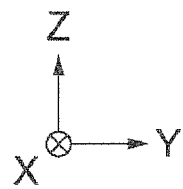

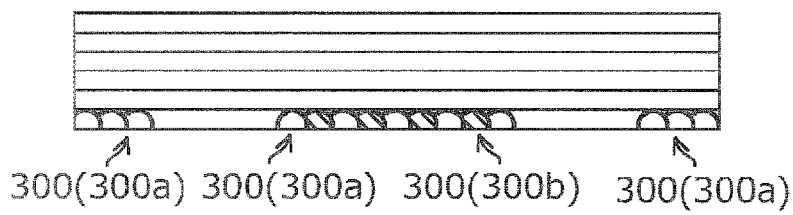
FIG.10A
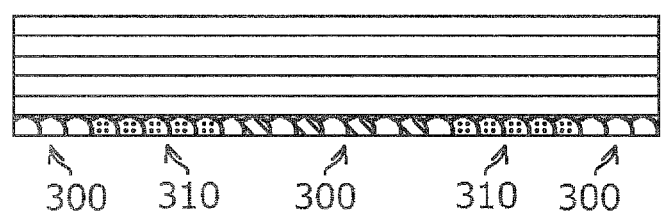
FIG.10B
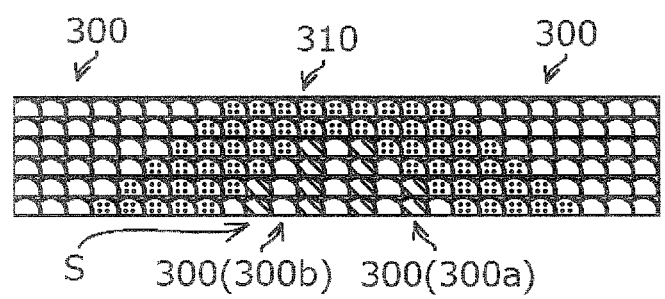
FIG.10C
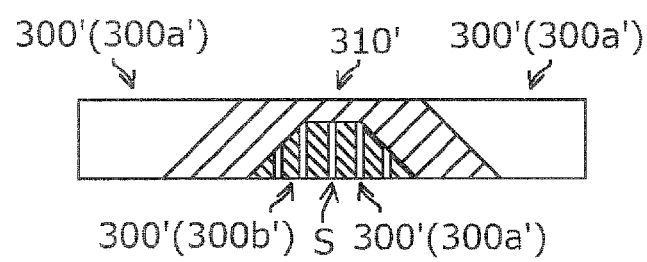 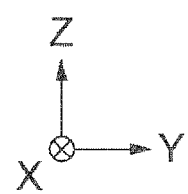
FIG.10D

THREE-DIMENSIONAL SHAPED ARTICLE PRODUCTION METHOD

This application is a continuation of U.S. Application Ser. No. 15/414,214, filed Jan. 24, 2017, which claims priority to Japanese patent No. 2016-015321, filed Jan. 29, 2016, which applications are expressly incorporated by reference herein.

BACKGROUND

1. Technical Field

The present invention relates to a three-dimensional shaped article production method.

2. Related Art

In the related art, production methods for producing a three-dimensional shaped article by stacking layers have been performed. Among these, a production method in which a three-dimensional shaped article is produced while supporting a constituent layer which corresponds to a constituent region of a three-dimensional shaped article when forming the constituent layer has been disclosed.

For example, JP-A-6-218712 (Patent Document 1) discloses a production method in which a cycle including formation of a layer from a powder material and ejection of a binder onto a portion which corresponds to a constituent region of a three-dimensional shaped article (that is, a constituent layer) is performed a plurality of times, whereby a three-dimensional shaped article is produced while supporting the constituent layer by the powder material in a portion other than the portion which corresponds to the constituent region.

A three-dimensional shaped article can be constituted by any of various materials, and for example, the shape of a three-dimensional shaped article is formed from a metal, a ceramic, or the like, and after completion of the shape of the three-dimensional shaped article, the article is sintered in some cases. Among these, there is a case where the constituent layer of a three-dimensional shaped article is sintered by collectively heating the constituent layer and a support layer thereof. In such a case, the support layer plays a role in supporting the constituent layer during sintering, and also in order to facilitate the release of the support layer from the constituent layer after sintering, a support layer which has a small change in shape accompanying the sintering of the constituent layer and also is not melted or sintered accompanying the sintering of the constituent layer is generally used.

However, in the case where such a support layer is formed, in the production method of the related art in which a three-dimensional shaped article is produced while supporting the constituent layer of the three-dimensional shaped article when the constituent layer is formed, the change in the shape of the support layer does not follow the change in the volume (shrinkage) accompanying the sintering of the constituent layer, and therefore, the constituent layer is distorted (that is, the sintered body of the three-dimensional shaped article is deformed) in some cases. That is, a three-dimensional shaped article with high accuracy cannot be produced due to the distortion of the constituent layer in some cases.

SUMMARY

An advantage of some aspects of the invention is to produce a three-dimensional shaped article with high accuracy.

A three-dimensional shaped article production method according to a first aspect of the invention is a three-dimensional shaped article production method for producing a three-dimensional shaped article by stacking layers to form a stacked body and includes a constituent layer formation step of forming a constituent layer which corresponds to a constituent region of the three-dimensional shaped article, a support layer formation step of forming a support layer which is in contact with the constituent layer and supports the constituent layer, and a sintering step of sintering the constituent layer, wherein the support layer is configured such that as compared with the volume decrement accompanying the sintering step of a space surrounded by the constituent layer from at least two directions, the volume decrement accompanying the sintering step of the support layer which supports the constituent layer in the space is larger.

According to this aspect of the invention, the support layer is configured such that as compared with the volume decrement accompanying the sintering step of a space surrounded by the constituent layer from at least two directions, the volume decrement accompanying the sintering step of the support layer which supports the constituent layer in the space is larger. That is, the shape of the support layer changes in response to the volume change (shrinkage) accompanying the sintering of the constituent layer, and therefore, the support layer does not hinder the shrinkage accompanying the sintering of the constituent layer. Due to this, the deformation of the sintered body of the three-dimensional shaped article can be suppressed, and thus, the three-dimensional shaped article with high accuracy can be produced.

Incidentally, the "volume decrement accompanying the sintering step of a space surrounded by the constituent layer" refers to a volume decrement based on the constituent material of the constituent layer, and refers to a volume decrement after the sintering step of the space in the case where the support layer is not present in the space.

Further, the "space surrounded by the constituent layer from at least two directions" refers to, for example, an internal space whose volume decreases when the overall shape is isotropically shrunk such as an internal space having a bottomed or bottomless cylindrical shape or an internal space having a cup-like shape such that an opening portion is larger or smaller than a bottom portion.

A three-dimensional shaped article production method according to a second aspect of the invention is directed to the first aspect, in which at least a portion of the support layer which supports the constituent layer in the space is structurally changed accompanying the sintering step.

According to this aspect of the invention, at least a portion of the support layer which supports the constituent layer in the space is structurally changed accompanying the sintering step. Due to this, by the structural change, the shape of the support layer changes in response to the volume change (shrinkage) accompanying the sintering of the constituent layer, and therefore, the hindrance of the support layer to shrinkage accompanying the sintering of the constituent layer can be effectively suppressed.

Incidentally, the "structural change accompanying the sintering step" includes, for example, a configuration in which a portion of the support layer forming material is decomposed and removed, and other than this, a configuration in which the structure of the support layer formed by a honeycomb structure, a truss structure, a lattice structure, or the like is collapsed accompanying the sintering step, and the like.

A three-dimensional shaped article production method according to a third aspect of the invention is directed to the first or second aspect, in which the support layer is configured such that at least a portion which supports the constituent layer in the space includes a region whose volume change accompanying the sintering step is relatively large and a region whose volume change accompanying the sintering step is relatively small.

According to this aspect of the invention, at least a portion of the support layer which supports the constituent layer in the space includes a region whose volume change accompanying the sintering step is relatively large and a region whose volume change accompanying the sintering step is relatively small. Due to this, the shape of the support layer changes in response to the volume change (shrinkage) accompanying the sintering of the constituent layer effectively by the region whose volume change is relatively large, and the constituent layer during sintering can be supported efficiently by the region whose volume change is relatively small.

Incidentally, the "region whose volume change is relatively large and the region whose volume change is relatively small" are not particularly limited with respect to the difference thereof or the absolute amount thereof as long as the volume change ratio (shrinkage ratio) of the region whose volume change is large is larger than the volume change ratio (shrinkage ratio) of the region whose volume change is small, and also includes a case where there is substantially no volume change ratio (shrinkage ratio) in the region whose volume change is small.

A three-dimensional shaped article production method according to a fourth aspect of the invention is directed to any one of the first to third aspects, in which at least a portion of the support layer which supports the constituent layer in the space is powdered accompanying the sintering step.

According to this aspect of the invention, at least a portion of the support layer which supports the constituent layer in the space is powdered accompanying the sintering step. Due to this, after the sintering step, the sintered body of the three-dimensional shaped article can be easily taken out from the support layer (the support layer can be easily removed from the sintered body of the three-dimensional shaped article).

A three-dimensional shaped article production method according to a fifth aspect of the invention is directed to any one of the first to fourth aspects, in which at least a portion of the support layer which supports the constituent layer in the space is volatilized accompanying the sintering step.

According to this aspect of the invention, at least a portion of the support layer which supports the constituent layer in the space is volatilized accompanying the sintering step. Due to this, by performing a step of removing a gas containing the volatilized component during the sintering step or after the sintering step, the support layer can be easily removed from the sintered body of the three-dimensional shaped article.

BRIEF DESCRIPTION OF THE DRAWINGS

The invention will be described with reference to the accompanying drawings, wherein like numbers reference like elements.

FIGS. 9A to 9E are schematic views showing specific examples of a three-dimensional shaped article which can be produced by a three-dimensional shaped article production method according to an embodiment of the invention.

FIGS. 10A to 10D are schematic views showing a three-dimensional shaped article production process according to another embodiment of the invention.

DESCRIPTION OF EXEMPLARY EMBODIMENTS

Figure 1:
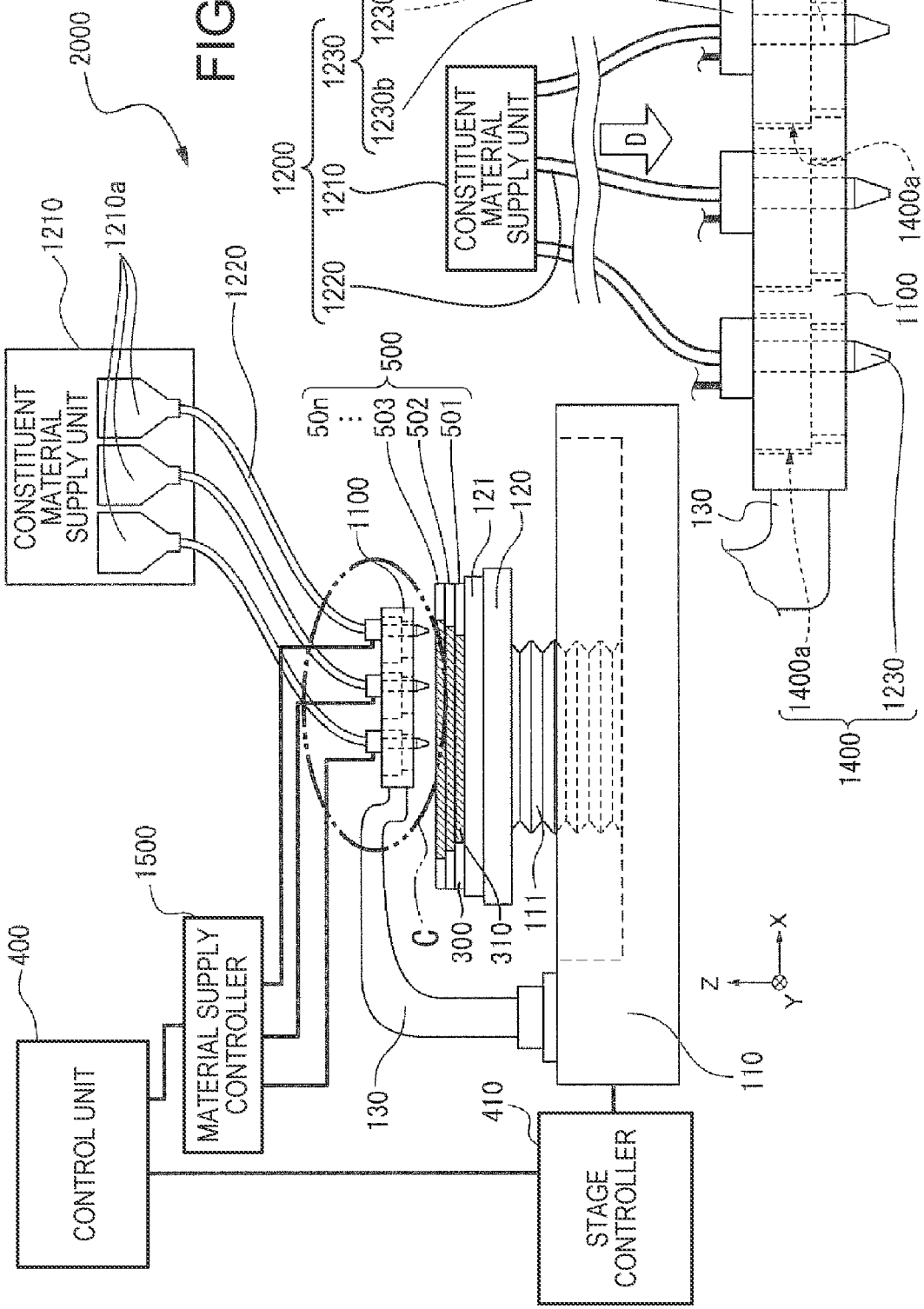
FIG. 1A is a schematic configuration view showing a configuration of a three-dimensional shaped article production apparatus according to an embodiment of the invention.
FIG. 1B is an enlarged view of a portion C shown in FIG. 1A.
Figure 2:
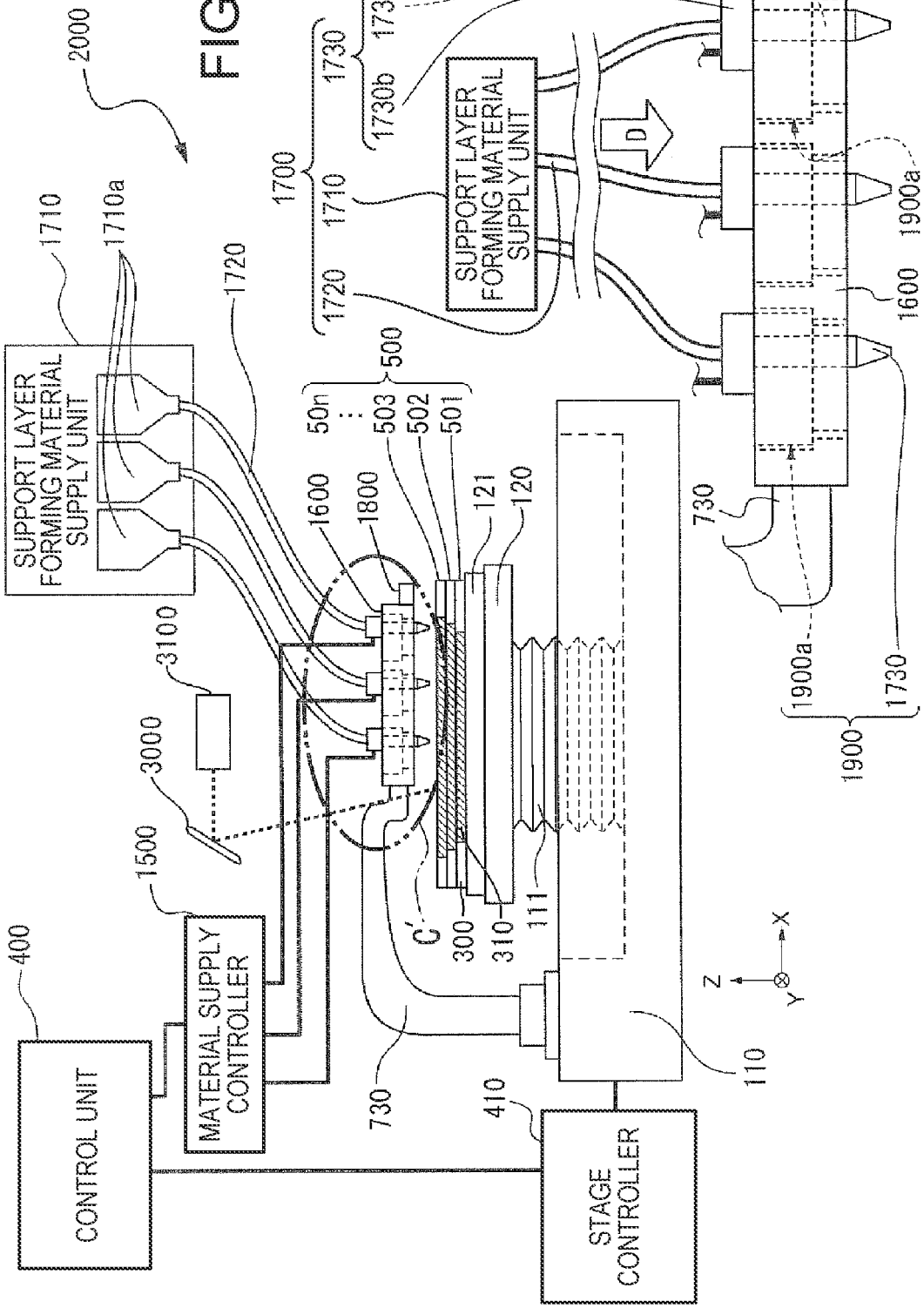
FIG. 2A is a schematic configuration view showing a configuration of a three-dimensional shaped article production apparatus according to an embodiment of the invention.
FIG. 2B is an enlarged view of a portion C' shown in FIG. 2A.

Hereinafter, embodiments according to the invention will be described with reference to the accompanying drawings.

FIGS. 1A to 2B are schematic configuration views showing a configuration of a three-dimensional shaped article production apparatus according to an embodiment of the invention.

Here, the three-dimensional shaped article production apparatus according to this embodiment includes two material supply sections (head bases) and two solidification sections. Among these, FIGS. 1A and 1B are views showing only one material supply section (a material supply section which supplies a constituent material (a material containing a powder constituting a three-dimensional shaped article, a solvent, and a binder)). FIGS. 2A and 2B are views showing one material supply section (a material supply section which supplies a support layer forming material for forming a support layer that supports a three-dimensional shaped article when the three-dimensional shaped article is formed) and two solidification sections (a curing section using an electromagnetic wave for curing the support layer forming material and a heating section using a laser for sintering the support layer forming material).

The "three-dimensional shaping" as used herein refers to the formation of a so-called "three-dimensional shaped article", and also includes, for example, the formation of a shape with a thickness even if the shape is a plate shape or a so-called two-dimensional shape. Further, the "supporting" as used herein includes supporting from the lower side, and in addition thereto, also includes supporting from the lateral side, and in some cases, supporting from the upper side.

A three-dimensional shaped article production apparatus 2000 (hereinafter referred to as "forming apparatus 2000") shown in FIGS. 1A to 2B includes a base 110 and a stage 120 which is provided movably in the X, Y, and Z directions shown in the drawing or drivably in the direction of rotation about the Z axis by a drive device 111 as a drive unit provided for the base 110.

Then, as shown in FIGS. 1A and 1B, the forming apparatus 2000 includes a head base support section 130, one end of which is fixed to the base 110, and to the other end of which, a head base 1100 that holds a plurality of head units 1400 each including a constituent material ejection section 1230 that ejects a constituent material is held and fixed.

Further, as shown in FIGS. 2A and 2B, the forming apparatus 2000 includes a head base support section 730, one end of which is fixed to the base 110, and to the other end of which, a head base 1600 that holds a plurality of head units 1900 each including a support layer forming material ejection section 1730 that ejects a material for forming a support layer that supports a three-dimensional shaped article is held and fixed.

Here, the head base 1100 and the head base 1600 are provided in parallel in the XY plane.

The constituent material ejection section 1230 and the support layer forming material ejection section 1730 have the same configuration. However, the configuration is not limited thereto.

On the stage 120, layers 501, 502, and 503 are formed in the process for forming a three-dimensional shaped article 500. In the formation of the three-dimensional shaped article 500, thermal energy is applied by a laser or the like, and therefore, in order to protect the stage 120 from heat, by using a sample plate 121 having heat resistance, the three-dimensional shaped article 500 may be formed on the sample plate 121. The sample plate 121 of this embodiment is made of a metal so that it is sturdy and is easily produced. However, as the sample plate 121, for example, by using a ceramic plate, high heat resistance can be obtained, and also the reactivity with the constituent material of the three-dimensional shaped article to be melted (or which may be sintered) is low, and thus, alteration of the three-dimensional shaped article 500 can be prevented. Incidentally, in FIGS. 1A and 2A, for the sake of convenience of explanation, three layers: the layers 501, 502, and 503 are shown as examples, however, the layers (up to the layer 50n in FIGS. 1A and 2A) are stacked until the desired shape of the three-dimensional shaped article 500 is obtained.

Here, the layers 501, 502, 503, . . . , and 50n are each constituted by a support layer 300 formed from the support layer forming material ejected from the support layer forming material ejection section 1730 and a constituent layer 310 formed from the constituent material ejected from the constituent material ejection section 1230.

FIG. 1B is an enlarged conceptual view of a portion C showing the head base 1100 shown in FIG. 1A. As shown in FIG. 1B, the head base 1100 holds a plurality of head units 1400. Although a detailed description will be given later, each head unit 1400 is configured such that the constituent material ejection section 1230 included in a constituent material supply device 1200 is held by a holding jig 1400a. The constituent material ejection section 1230 includes an ejection nozzle 1230a and an ejection drive section 1230b that allows the constituent material to be ejected from the ejection nozzle 1230a by a material supply controller 1500.

FIG. 2B is an enlarged conceptual view of a portion C' showing the head base 1600 shown in FIG. 2A. As shown in FIG. 2B, the head base 1600 holds a plurality of head units 1900. Each head unit 1900 is configured such that the support layer forming material ejection section 1730 included in a support layer forming material supply device 1700 is held by a holding jig 1900a. The support layer forming material ejection section 1730 includes an ejection nozzle 1730a and an ejection drive section 1730b that allows the support layer forming material to be ejected from the ejection nozzle 1730a by the material supply controller 1500. Further, the head base 1600 is provided with an electromagnetic wave irradiation section 1800 for curing the support layer forming material in the case where a material which can be cured by an electromagnetic wave (such as an ultraviolet ray) is used as the support layer forming material. In addition, in the case where a material which can be dissolved in a solvent is used as a binder to be contained in the support layer forming material, the head base 1600 may be provided with an electromagnetic wave (infrared ray) irradiation section 1800 for removing the solvent and curing the support layer forming material (binding with the binder). Further, in the case where a material which can be sintered is used as the support layer forming material, a laser irradiation section 3100 for sintering the support layer forming material and a galvanometer mirror 3000 which determines the position of the laser light from the laser irradiation section 3100 are provided on the upper side of the stage 120.

As shown in FIGS. 1A and 1B, the constituent material ejection section 1230 is connected to a constituent material supply unit 1210 which houses a constituent material made to correspond to each head unit 1400 held by the head base 1100 through a supply tube 1220. Then, a given constituent material is supplied to the constituent material ejection section 1230 from the constituent material supply unit 1210. In the constituent material supply unit 1210, the constituent material of the three-dimensional shaped article 500 to be shaped by the forming apparatus 2000 according to this embodiment is housed in a constituent material housing section 1210a, and each individual constituent material housing section 1210a is connected to each individual constituent material ejection section 1230 through the supply tube 1220. In this manner, by including the individual constituent material housing sections 1210a, a plurality of different types of materials can be supplied from the head base 1100.

As shown in FIGS. 2A and 2B, the support layer forming material ejection section 1730 is connected to a support layer forming material supply unit 1710 which houses a support layer forming material made to correspond to each head unit 1900 held by the head base 1600 through a supply tube 1720. Then, a given support layer forming material is supplied to the support layer forming material ejection section 1730 from the support layer forming material supply unit 1710. In the support layer forming material supply unit 1710, the support layer forming material constituting a support layer when shaping the three-dimensional shaped article 500 is housed in a support layer forming material housing section 1710a, and each individual support layer forming material housing section 1710a is connected to each individual support layer forming material ejection section 1730 through the supply tube 1720. In this manner, by including the individual support layer forming material housing sections 1710a, a plurality of different types of support layer forming materials can be supplied from the head base 1600.

As the constituent material and the support layer forming material, for example, a simple substance powder of magnesium (Mg), iron (Fe), cobalt (Co), chromium (Cr), aluminum (Al), titanium (Ti), copper, (Cu), or nickel (Ni), or a mixed powder of an alloy containing at least one metal among these (a maraging steel, stainless steel, cobalt-chrome-molybdenum, a titanium alloy, a nickel alloy, an aluminum alloy, a cobalt alloy, or a cobalt-chromium alloy) or the like is prepared as a mixed material or the like in the form of a slurry (or a paste) containing a solvent and a binder.

It is also possible to use general purpose engineering plastics such as polyamide, polyacetal, polycarbonate, modified polyphenylene ether, polybutylene terephthalate, and polyethylene terephthalate. In addition thereto, it is also possible to use engineering plastics such as polysulfone, polyethersulfone, polyphenylene sulfide, polyarylate, polyimide, polyamideimide, polyetherimide, and polyether ether ketone.

In this manner, the constituent material and the support layer forming material are not particularly limited, and a metal other than the above-mentioned metals, a ceramic, a resin, or the like can also be used. Further, silicon dioxide, titanium dioxide, aluminum oxide, zirconium oxide, or the like can be preferably used.

Examples of the solvent include water; (poly) alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; and ionic liquids such as tetra-alkyl ammonium acetate (for example, tetra-butyl ammonium acetate, etc.), and one type or two or more types in combination selected from these can be used.

As the binder, for example, an acrylic resin, an epoxy resin, a silicone resin, a cellulosic resin, or another synthetic resin, or PLA (polylactic acid), PA (polyamide), PPS (polyphenylene sulfide), or another thermoplastic resin can be used. Further, a UV curable resin which is polymerized by irradiation with an ultraviolet ray may be used as the binder.

The forming apparatus 2000 includes a control unit 400 as a control device which controls the stage 120, the constituent material ejection section 1230 included in the constituent material supply device 1200, and the support layer forming material ejection section 1730 included in the support layer forming material supply device 1700 based on the data for shaping a three-dimensional shaped article to be output from a data output device such as, for example, a personal computer (not shown). The control unit 400 includes a control section (not shown) which controls the stage 120 and the constituent material ejection section 1230 so that these members are driven and operated in cooperation with each other, and also controls the stage 120 and the support layer forming material ejection section 1730 so that these members are driven and operated in cooperation with each other.

The stage 120 provided movably for the base 110, and a signal for controlling the start and stop of movement, the direction of movement, the amount of movement, the speed of movement, or the like of the stage 120 is generated in a stage controller 410 based on a control signal from the control unit 400 and sent to the drive device 111 included in the base 110, and the stage 120 moves in the X, Y, or Z direction shown in the drawing. In the constituent material ejection section 1230 included in the head unit 1400, a signal for controlling the amount of the material ejected from the ejection nozzle 1230*a* in the ejection drive section 1230*b* included in the constituent material ejection section 1230 or the like is generated in the material supply controller 1500 based on a control signal from the control unit 400, and a predetermined amount of the constituent material is ejected from the ejection nozzle 1230*a* based on the generated signal.

In the same manner, in the support layer forming material ejection section 1730 included in the head unit 1900, a signal for controlling the amount of the material ejected from the ejection nozzle 1730*a* in the ejection drive section 1730*b* included in the support layer forming material ejection section 1730 or the like is generated in the material supply controller 1500 based on a control signal from the control unit 400, and a predetermined amount of the support layer forming material is ejected from the ejection nozzle 1730*a* based on the generated signal.

Next, the head unit 1400 will be described in further detail. The head unit 1900 has the same configuration as that of the head unit 1400, and therefore, a detailed description of the configuration of the head unit 1900 will be omitted.

Figure 3:
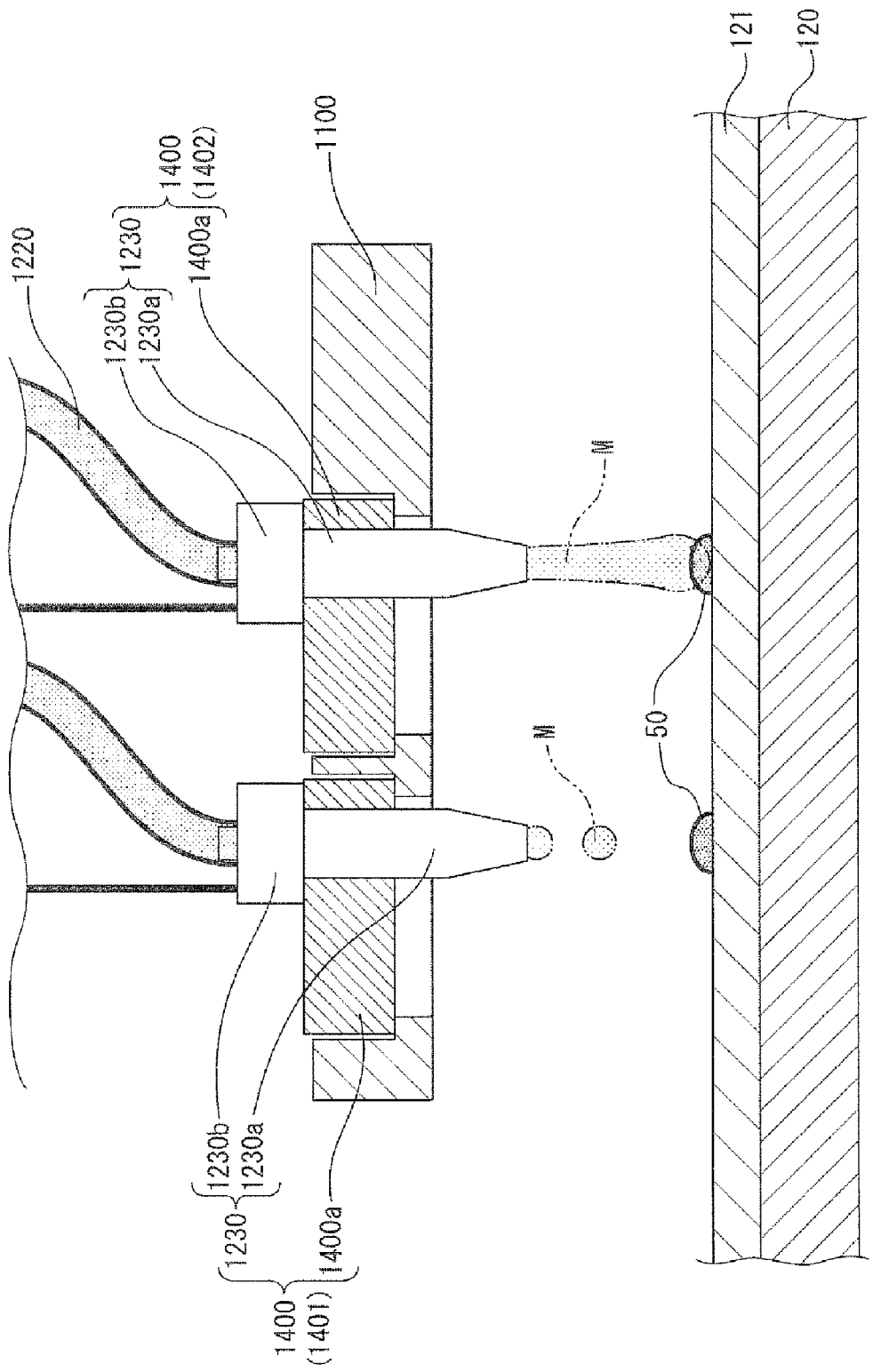
FIG. 3 is a schematic perspective view of a head base according to an embodiment of the invention.
Figure 4A:
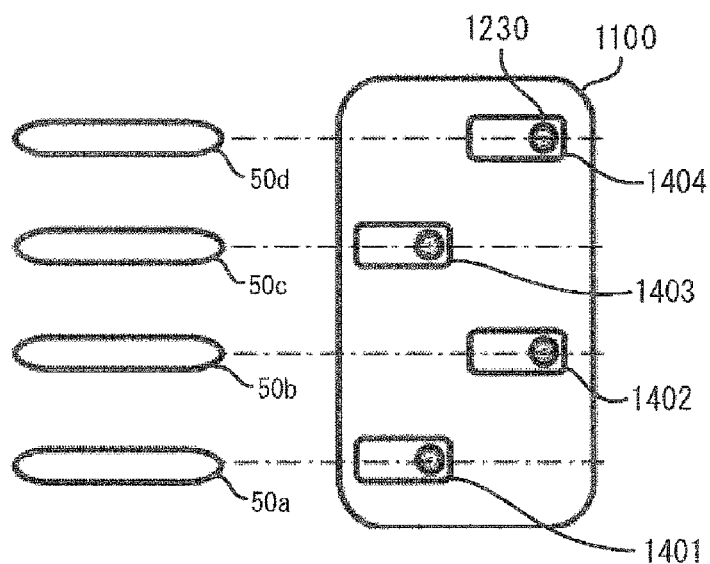
FIGS. 4A to 4C are plan views conceptually illustrating the relationship between the arrangement of head units and the form of formation of a three-dimensional shaped article according to an embodiment of the invention.
Figure 4B:
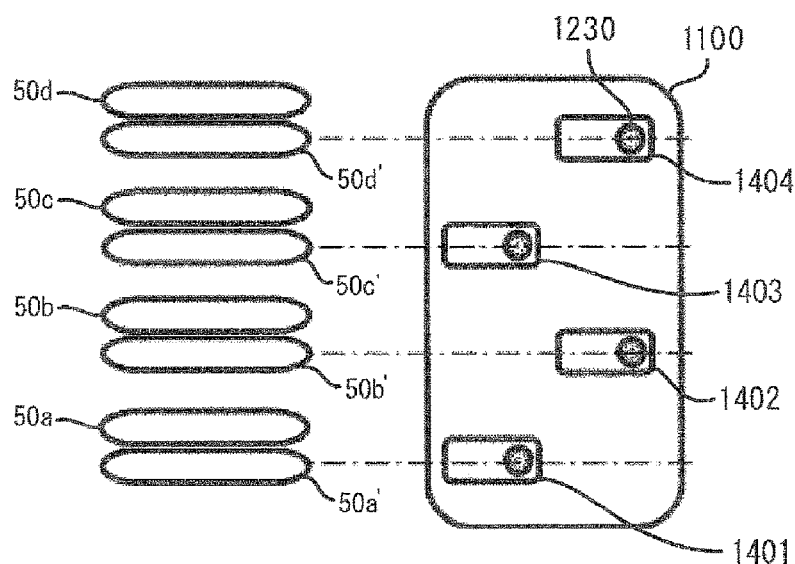
Figure 4C:
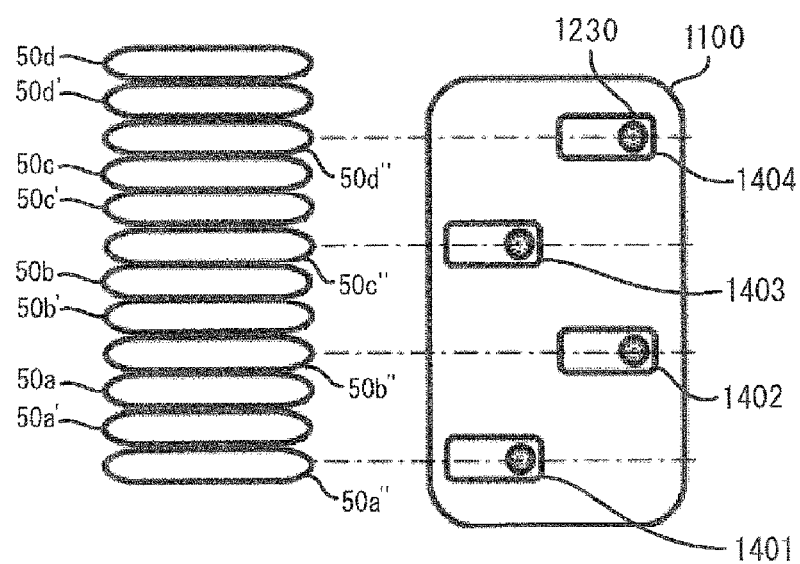

FIGS. 3 to 4C show one example of the holding form of a plurality of head units 1400 and the constituent material ejection sections 1230 held by the head base 1100, and among these, FIGS. 4A to 4C are external views of the head base 1100 viewed from the direction of the arrow D shown in FIG. 1B.

As shown in FIG. 3, a plurality of head units 1400 are held by the head base 1100 through a fixing unit (not shown). Further, as shown in FIGS. 4A to 4C, in the head base 1100 of the forming apparatus 2000 according to this embodiment, the head units 1400 are included such that the following 4 units: a head unit 1401 in the first row from the lower side in the drawing, a head unit 1402 in the second row, a head unit 1403 in the third row, and a head unit 1404 in the fourth row are arranged in a staggered manner (alternately). Then, as shown in FIG. 4A, while moving the stage 120 in the X direction with respect to the head base 1100, the constituent material is ejected from each head unit 1400, whereby constituent layer constituting parts 50 (constituent layer constituting parts 50*a*, 50*b*, 50*c*, and 50*d*) are formed. The procedure for forming the constituent layer constituting parts 50 will be described later.

Incidentally, although not shown in the drawing, the constituent material ejection sections 1230 included in the respective head units 1401 to 1404 are configured to be connected to the constituent material supply unit 1210 through the ejection drive section 1230*b* with the supply tube 1220.

As shown in FIG. 3, the constituent material ejection section 1230 ejects a material M which is the constituent material of the three-dimensional shaped article from the ejection nozzle 1230*a* onto the sample plate 121 placed on the stage 120. In the head unit 1401, an ejection form in which the material M is ejected in the form of a liquid droplet is illustrated, and in the head unit 1402, an ejection form in which the material M is supplied in the form of a continuous body is illustrated. The ejection form of the material M may be in the form of either a liquid droplet or a continuous body, however, in this embodiment, a case where a form in which the material M is ejected in the form of a liquid droplet is adopted will be described.

The material M ejected in the form of a liquid droplet from the ejection nozzle 1230*a* flies substantially in the direction of gravity and lands on the sample plate 121. The stage 120 moves, and by the material M landing on the sample plate 121, the constituent layer constituting parts 50 are formed. An assembly of the constituent layer constituting parts 50 is formed as the constituent layer 310 (see FIG. 1A) of the three-dimensional shaped article 500 formed on the sample plate 121.

Next, the procedure for forming the constituent layer constituting parts 50 will be described with reference to FIGS. 4A to 5B.

Figure 5A:
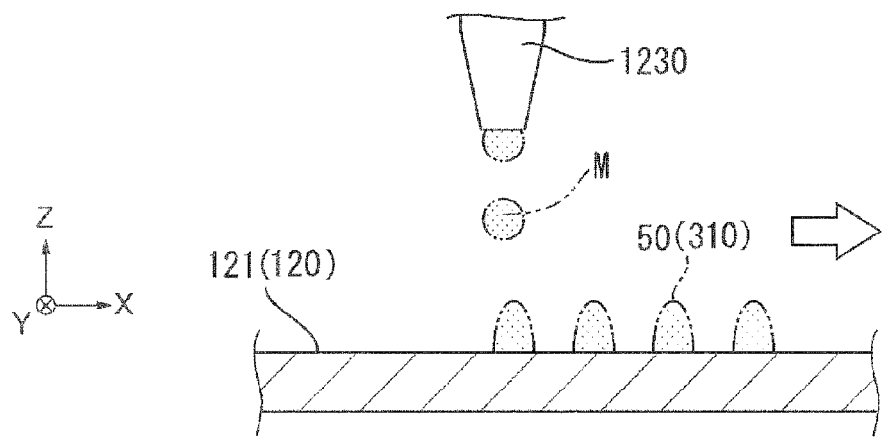
FIGS. 5A and 5B are schematic views conceptually illustrating the form of formation of a three-dimensional shaped article.
Figure 5B:
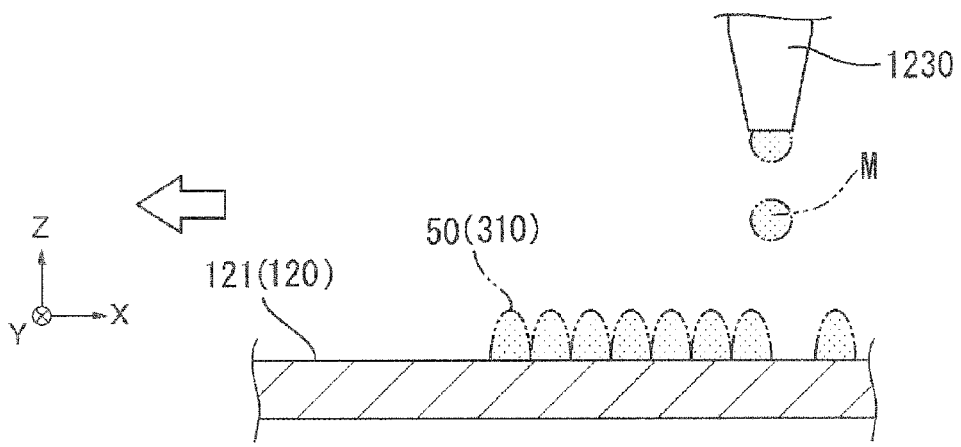

FIGS. 4A to 4C are plan views conceptually illustrating the relationship between the arrangement of head units 1400 of this embodiment and the form of formation of the constituent layer constituting parts 50. FIGS. 5A and 5B are side views conceptually illustrating the form of formation of the constituent layer constituting parts 50.

First, when the stage 120 moves in the +X direction, the material M is ejected in the form of a liquid droplet from the plurality of ejection nozzles 1230*a*, and the material M is placed at a predetermined position on the sample plate 121, and therefore, the constituent layer constituting parts 50 are formed.

More specifically, first, as shown in FIG. 5A, while moving the stage 120 in the +X direction, the material M is placed at predetermined positions at regular intervals on the sample plate 121 from the plurality of ejection nozzles 1230*a*.

Subsequently, as shown in FIG. 5B, while moving the stage 120 in the −X direction shown in FIG. 1A, the material M is newly placed so as to fill the gap between the materials M placed at regular intervals.

However, a configuration in which while moving the stage 120 in the +X direction, the materials M are ejected from the plurality of ejection nozzles 1230*a* so that the materials M overlap with each other (so as not to form a gap) at predetermined positions on the sample plate 121 (not a configuration in which the constituent layer constituting parts 50 are formed by the reciprocation of the stage 120 in the X direction, but a configuration in which the constituent layer constituting parts 50 are formed by only one way movement of the stage 120 in the X direction) may be adopted.

By forming the constituent layer constituting parts 50 as described above, the constituent layer constituting parts 50 (the constituent layer constituting parts 50*a*, 50*b*, 50*c*, and 50*d*) for one line (of the first line in the Y direction) in the X direction of the respective head units 1401, 1402, 1403, and 1404 as shown in FIG. 4A are formed.

Subsequently, in order to form constituent layer constituting parts 50' (constituent layer constituting parts 50*a*', 50*b*', 50*c*', and 50*d*') of the second line in the Y direction of the respective head units 1401, 1402, 1403, and 1404, the head base 1100 is moved in the −Y direction. As for the amount of movement, when the pitch between the nozzles is represented by P, the head base 1100 is moved in the −Y direction by a distance of P/n (n represents a natural number). In this embodiment, a description will be given by assuming that n is 3.

By performing the same operation as described above as shown in FIGS. 5A and 5B, the constituent layer constituting parts 50' (constituent layer constituting parts 50*a*', 50*b*', 50*c*', and 50*d*') of the second line in the Y direction as shown in FIG. 4B are formed.

Subsequently, in order to form constituent layer constituting parts 50" (constituent layer constituting parts 50*a*", 50*b*", 50*c*", and 50*d*") of the third line in the Y direction of the respective head units 1401, 1402, 1403, and 1404, the head base 1100 is moved in the −Y direction. As for the amount of movement, the head base 1100 is moved in the −Y direction by a distance of P/3.

Then, by performing the same operation as described above as shown in FIGS. 5A and 5B, the constituent layer constituting parts 50" (constituent layer constituting parts 50*a*", 50*b*", 50*c*", and 50*d*") of the third line in the Y direction as shown in FIG. 4C are formed, and thus, the constituent layer 310 can be obtained.

Further, as for the material M ejected from the constituent material ejection section 1230, from any one unit or two or more units of the head units 1401, 1402, 1403, and 1404, a constituent material different from the other head units can also be ejected and supplied. Therefore, by using the forming apparatus 2000 according to this embodiment, a three-dimensional shaped article formed from different materials can also be obtained.

Incidentally, in the layer 501 as the first layer, by ejecting the support layer forming material from the support layer forming material ejection section 1730 before or after forming the constituent layer 310 as described above, the support layer 300 can be formed in the same manner as described above. Then, also when forming the layers 502, 503, . . . , and 50*n* by being stacked on the layer 501, the constituent layer 310 and the support layer 300 can be formed in the same manner as described above. The support layer 300 can be cured using the electromagnetic wave irradiation section 1800, or sintered using the laser irradiation section 3100 and the galvanometer mirror 3000, or the like according to the type of the support layer forming material.

Figure 6A:
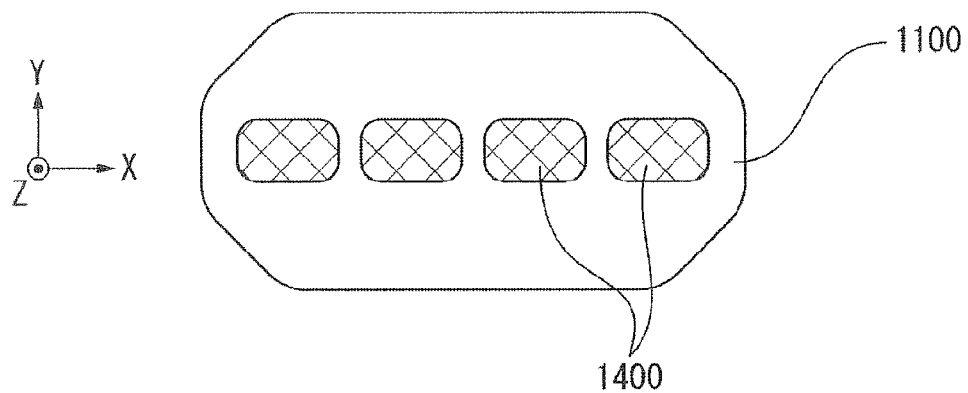
FIGS. 6A and 6B are schematic views showing examples of other arrangements of head units arranged in a head base.
Figure 6B:
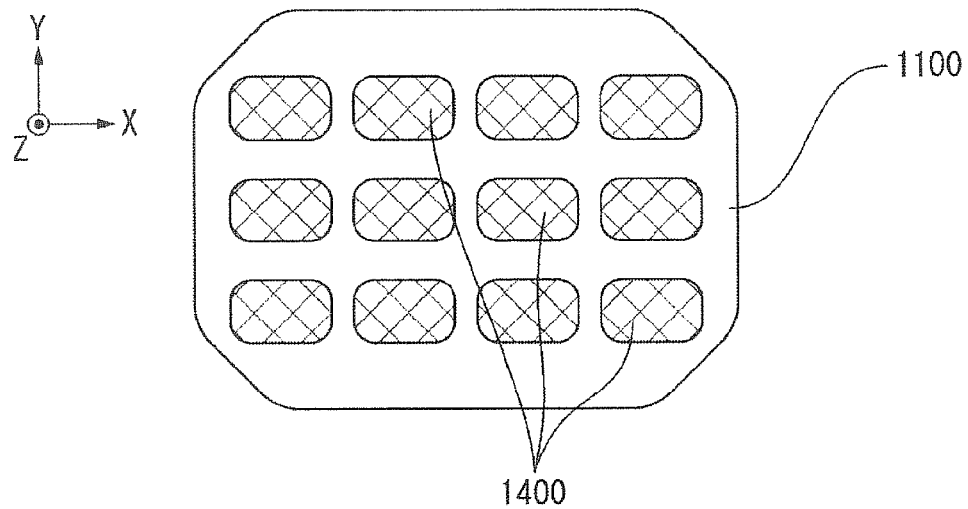

The number and arrangement of the head units 1400 and 1900 included in the forming apparatus 2000 according to this embodiment described above are not limited to the above-mentioned number and arrangement. FIGS. 6A and 6B schematically show examples of other arrangement of the head units 1400 placed in the head base 1100.

FIG. 6A shows a form in which a plurality of head units 1400 are arranged in parallel in the X-axis direction in the head base 1100. FIG. 6B shows a form in which the head units 1400 are arranged in a lattice pattern in the head base 1100. The number of the head units to be arranged is not limited to the examples shown in FIGS. 6A and 6B in either case.

Next, one embodiment of a three-dimensional shaped article production method to be performed using the above-mentioned forming apparatus 2000 according to this embodiment will be described.

Figure 7A:
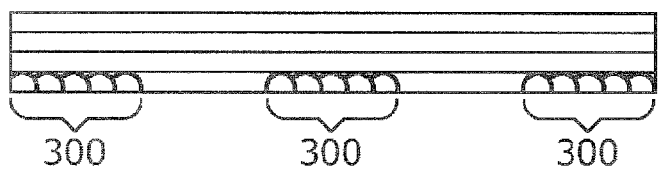
FIGS. 7A to 7F are schematic views showing a three-dimensional shaped article production process according to an embodiment of the invention.
Figure 7B:
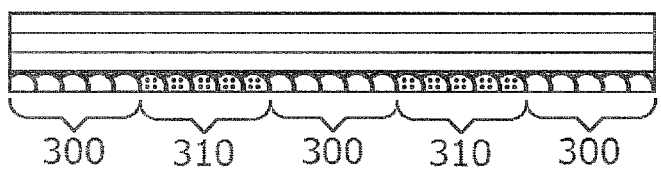
Figure 7C:
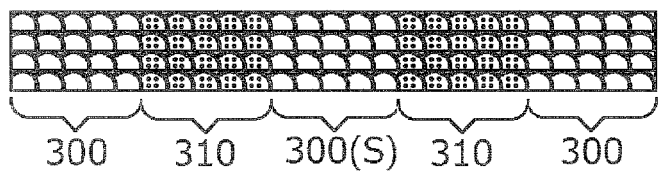
Figure 7D:
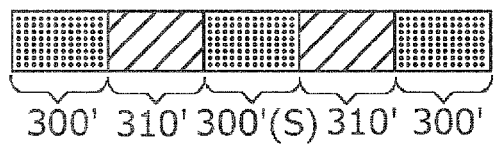
Figure 7E:
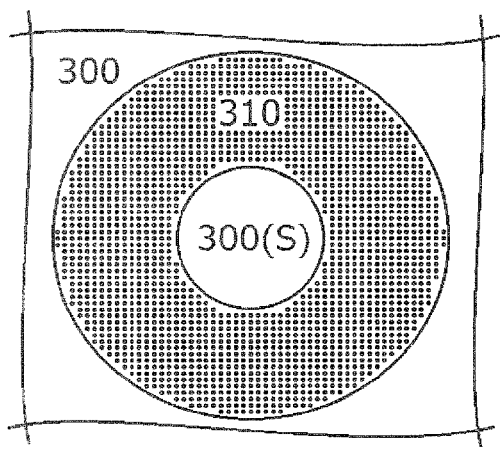
Figure 7F:
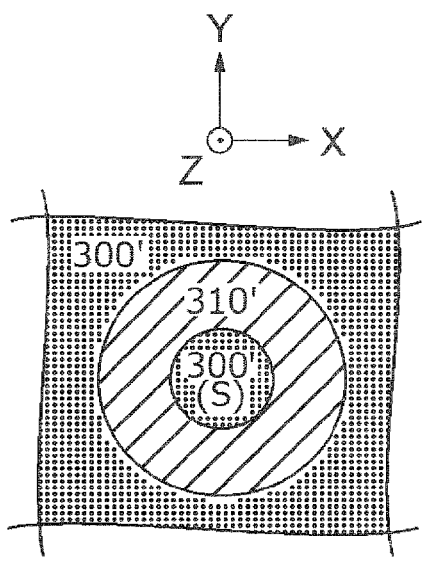

FIGS. 7A to 7F are schematic views showing one example of a three-dimensional shaped article production process to be performed using the forming apparatus 2000. FIGS. 7A to 7D show the three-dimensional shaped article production process in side view, and FIGS. 7E and 7F show the three-dimensional shaped article production process in plan view. Further, 7E and 7F correspond to 7C and 7D, respectively.

First, FIG. 7A shows a state where the support layer 300 in the layer 501 as the first layer is formed on the sample plate 121 using the support layer forming material ejection section 1730. In this embodiment, as the support layer forming material, a material containing ceramic particles and a UV curable resin as the binder is used. As the support layer forming material, a material containing ceramic particles, a solvent, and a binder may be used.

Here, FIG. 7A shows a state where the support layer forming material is ejected from the support layer forming material ejection section 1730 and also an electromagnetic wave is irradiated onto the support layer forming material from the electromagnetic wave irradiation section 1800.

Subsequently, FIG. 7B shows a state where the constituent layer 310 as the first layer is formed on the sample plate 121 using the constituent material ejection section 1230. In this embodiment, as the constituent material, a material containing metal particles is used.

Then, by repeating the formation of the support layer 300 shown in FIG. 7A and the formation of the constituent layer 310 shown in FIG. 7B, a stacked body of the three-dimensional shaped article is formed as shown in FIGS. 7C and 7E.

Here, as shown in FIGS. 7C and 7E, the stacked body of the three-dimensional shaped article of this embodiment has a bottomless cylindrical shape, and a portion surrounded by the constituent layer 310 forms a space S (to be exact, a space S surrounded by the constituent layer 310 from at least two directions).

Then, finally, the stacked body of the three-dimensional shaped article formed as shown in FIGS. 7C and 7E is heated in a high-temperature chamber (heating chamber) provided separately from the forming apparatus 2000 according to this embodiment (the constituent layer 310 is sintered into a sintered part 310'). Here, FIGS. 7D and 7F show a state where the stacked body of the three-dimensional shaped article is sintered.

In FIGS. 7D and 7F, in the sintered part 310', the metal particles are sintered, and in the support layer 300' after heating, the binder and the like are thermally decomposed and then volatilized and removed, and therefore, due to the ceramic particles, the layer is turned into particles (a powder).

Here, as apparent from the comparison between FIG. 7C and FIG. 7D, and between FIG. 7E and FIG. 7F, when the constituent layer 310 is sintered, the volume decreases.

To describe the volume decrease (volume shrinkage), when the length in one direction after sintering is represented by L, the length in the one direction before sintering is represented by $L_0$, the packing density of the particles is represented by A, and the sintering density is represented by B, the relationship of these factors is represented by the following formula 1.

$$L^3 = L_0^3 \times (A/B) \qquad \text{(Formula 1)}$$

That is, the constituent layer 310 is shrunk such that the length L in one direction after sintering is represented as follows: $L_0^3 \times (A/B)^{1/3}$.

In the following Table 1, specific examples of the volume shrinkage ratio calculated from the packing density of the metal particles in the constituent material and the sintering density are shown.

TABLE 1

| | | | | |
|---|---|---|---|---|
| Packing density of particles (%) | 50.0 | 55.0 | 60.0 | 65.0 |
| Sintering density (%) | 98.0 | 98.0 | 98.0 | 98.0 |
| Volume after sintering (%) | 51.0 | 56.1 | 61.2 | 66.3 |
| Length in one direction after sintering (%) | 79.9 | 82.5 | 84.9 | 87.2 |
| Volume shrinkage ratio (%) | 20.1 | 17.5 | 15.1 | 12.8 |

In this manner, the stacked body of the three-dimensional shaped article is shrunk by sintering, and therefore, in the case where the volume shrinkage ratio of the support layer 300 in the space S is lower than the shrinkage ratio of the stacked body of the three-dimensional shaped article after sintering, the stacked body (constituent layer 310) of the three-dimensional shaped article is distorted. Due to this, in this embodiment, the components of the support layer forming material and the formulation thereof are determined so that the volume shrinkage ratio of the support layer 300 in the space S is higher than the shrinkage ratio of the stacked body of the three-dimensional shaped article after sintering.

Next, one example of the three-dimensional shaped article production method to be performed using the above-mentioned forming apparatus 2000 (an example corresponding to FIGS. 7A to 7F) will be described with reference to a flowchart.

Figure 8:
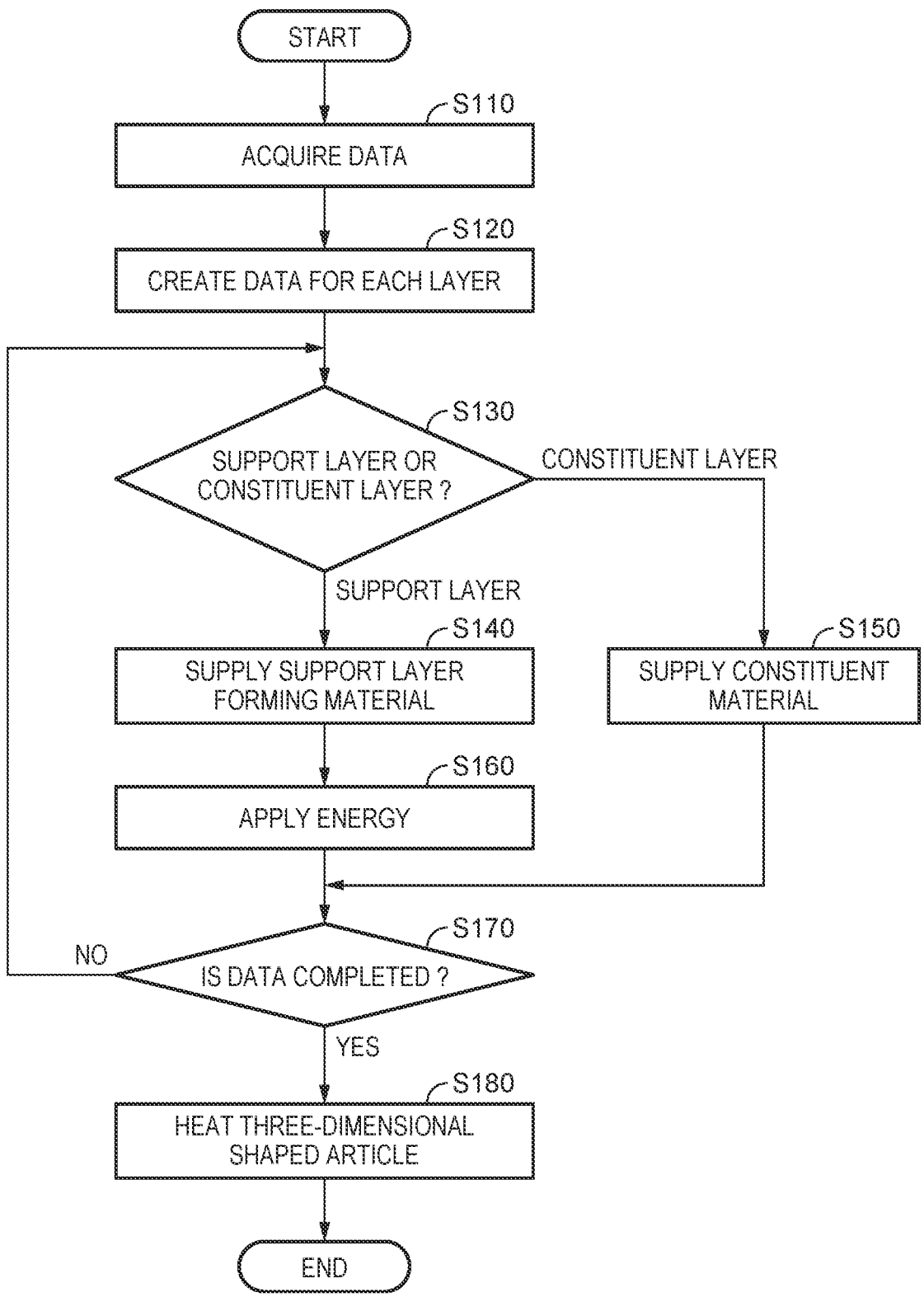
FIG. 8 is a flowchart showing a three-dimensional shaped article production method according to an embodiment of the invention.

Here, FIG. 8 is a flowchart of the three-dimensional shaped article production method according to this embodiment.

As shown in FIG. 8, in the three-dimensional shaped article production method according to this embodiment, first, in Step S110, the data of the three-dimensional shaped article is acquired. More specifically, the data representing the shape of the three-dimensional shaped article is acquired from, for example, an application program or the like executed by a personal computer.

Subsequently, in Step S120, data for each layer are created. More specifically, in the data representing the shape of the three-dimensional shaped article, the three-dimensional shaped article is sliced according to the shaping resolution in the Z direction, and bitmap data (cross-sectional data) are created for each cross section.

At this time, the bitmap data to be created are data discriminated between the three-dimensional shaped article formation region (constituent layer 310) and the three-dimensional shaped article non-formation region (support layer 300).

Subsequently, in Step S130, it is determined whether the data of the layer to be formed are the data for forming the three-dimensional shaped article non-formation region (support layer 300) or the data for forming the three-dimensional shaped article formation region (constituent layer 310). This determination is performed by the control section included in the control unit 400.

In this step, in the case where the data is determined to be the data for forming the support layer 300, the process proceeds to Step S140, and in the case where the data is determined to be the data for forming the constituent layer 310, the process proceeds to Step S150.

In Step S140, by ejecting the support layer forming material from the support layer forming material ejection section 1730 based on the data for forming the support layer 300, the support layer forming material is supplied.

Then, when the support layer forming material is ejected in Step S140, an electromagnetic wave (ultraviolet ray) is irradiated (energy is applied) from the electromagnetic wave irradiation section 1800 in Step S160, whereby the ejected liquid droplet (the support layer 300) is solidified.

On the other hand, in Step S150, by ejecting the constituent material from the constituent material ejection section 1230, the constituent material is supplied.

Then, the process from Step S130 to Step S170 is repeated until it is determined in Step S170 that the formation of the stacked body of the three-dimensional shaped article based on the bitmap data corresponding to the respective layers created in Step S120 is completed.

Then, the stacked body of the three-dimensional shaped article formed in the above steps is heated in a thermostatic chamber (not shown) in Step S180. More specifically, the three-dimensional shaped article formation region (constituent layer 310) is sintered, and the resin component and the like of the surrounding support layer 300 are decomposed and removed, whereby the support layer 300 is turned into particles with the ceramic particles. Here, the volume shrinkage ratio of the support layer 300' after heating is higher than the volume shrinkage ratio of the constituent layer 310 (sintered part 310') after heating (the volume of the support layer 300' after heating corresponding to the space S is smaller than the volume of the sintered part 310').

Then, accompanying the completion of Step S180, the three-dimensional shaped article production method of this embodiment is completed.

Specific examples of the shape of the three-dimensional shaped article configured as described above will be described.

FIGS. 9A to 9E are schematic exploded side views showing the specific examples, and among these, FIG. 9A shows a shape in which two flat plates extending in the X direction are joined in one side, and therefore, slopes are formed. FIG. 9B shows a shape in which two bottomless cylinders are overlapped with each other. FIG. 9C shows a shape which is a bottomed cylindrical shape and has portions with different inner diameters. Further, FIG. 9D shows a shape in which a tunnel P corresponding to a pipe is formed in the shape of FIG. 9C. FIG. 9E shows a dome-like shape. Also in the tunnel P, the support layer 300 is formed such that the volume shrinkage ratio of the support layer 300 in the space S in the tunnel P is higher than the shrinkage ratio of the stacked body of the three-dimensional shaped article.

It goes without saying that the invention is not limited to these shapes.

As described above, the three-dimensional shaped article production method of this embodiment is a three-dimensional shaped article production method for producing a three-dimensional shaped article by stacking layers to form a stacked body.

Then, the method includes the constituent layer formation step (corresponding to Step S150) of forming the constituent layer 310 which corresponds to the constituent region of the three-dimensional shaped article, the support layer formation step (corresponding to Step S140) of forming the support layer 300 which is in contact with the constituent layer 310 and supports the constituent layer 310, and the sintering step (corresponding to Step S180) of sintering the constituent layer 310.

Here, the support layer 300 is configured such that as compared with the volume decrement accompanying the sintering step of a space S surrounded by the constituent layer from at least two directions, the volume decrement accompanying the sintering step of the support layer 300 which supports the constituent layer 310 in the space S is larger.

That is, the support layer 300 is configured such that the shape of the support layer 300 changes in response to the volume change (shrinkage) accompanying the sintering of the constituent layer 310, and therefore, the support layer 300 does not hinder the shrinkage accompanying the sintering of the constituent layer 310. Due to this, the deformation of the sintered body (sintered part 310') of the three-dimensional shaped article can be suppressed, and thus, the three-dimensional shaped article with high accuracy can be produced.

Incidentally, the "volume decrement accompanying the sintering step of a space S surrounded by the constituent layer 310" refers to a volume decrement based on the constituent material of the constituent layer 310, and refers to a volume decrement after the sintering step of the space S in the case where the support layer 300 is not present in the space S.

Further, the "space S surrounded by the constituent layer 310 from at least two directions" refers to, for example, an internal space whose volume decreases when the overall shape is isotropically shrunk such as an internal space (space S) having a bottomed or bottomless cylindrical shape (for example, corresponding to FIGS. 9B, 9C, and 9D) or an internal space having a cup-like shape (for example, corresponding to FIG. 9E) such that an opening portion is larger or smaller than a bottom portion.

In the embodiment of the three-dimensional shaped article production method shown in FIGS. 7A to 7F, the support layer 300 is structurally changed (partially turned into the form of particles from a cured state by decomposing and removing a portion) accompanying the sintering step in the entire portion which supports the constituent layer 310 in the space S. However, the invention is not limited to such a configuration, and a portion of the support layer 300 which supports the constituent layer 310 in the space S may be structurally changed accompanying the sintering step.

When the support layer 300 is configured such that at least a portion which supports the constituent layer 310 in the space S is structurally changed accompanying the sintering step, by the structural change, the shape of the support layer 300 changes in response to the volume change (shrinkage) accompanying the sintering of the constituent layer 310, and therefore, the hindrance of the support layer 300 to shrinkage accompanying the sintering of the constituent layer 310 can be effectively suppressed.

Incidentally, the "structural change accompanying the sintering step" includes a configuration in which a portion of the support layer forming material is decomposed and removed and is turned into the form of particles as described above, and other than this, a configuration in which the structure of the support layer formed by, for example, a honeycomb structure, a truss structure, a lattice structure, or the like is collapsed accompanying the sintering step, the support layer forming material is melted and the shape of the support layer is changed before and after the melting, and the like.

Hereinafter, an embodiment of the three-dimensional shaped article production method in which a portion of the support layer 300 which supports the constituent layer 310 in the space S is structurally changed accompanying the sintering step will be described.

FIGS. 10A to 10D are schematic views showing one example of the three-dimensional shaped article production process in one embodiment of such a three-dimensional shaped article production method. FIGS. 10A to 10D show the three-dimensional shaped article production process in side view.

In this embodiment, as the support layer forming material, the following two materials: a first material 300a, which is composed of a resin component and the like, and in which all the components are decomposed and removed (volatilized) in the sintering step, and a second material 300b containing ceramic particles are used.

First, FIG. 10A shows a state where the support layer 300 in the layer 501 as the first layer is formed on the sample plate 121 using the support layer forming material ejection section 1730. In this embodiment, the first material 300a and the second material 300b are alternately disposed.

Here, FIG. 10A shows a state where the support layer forming materials (the first material 300a and the second material 300b) are ejected from the support layer forming material ejection section 1730 and also a laser is irradiated onto the second material 300b from the laser irradiation section 3100, whereby the second material 300b is sintered.

Subsequently, FIG. 10B shows a state where the constituent layer 310 in the layer 501 as the first layer is formed on the sample plate 121 using the constituent material ejection section 1230. In this embodiment, as the constituent material, a material containing metal particles is used.

Then, by repeating the formation of the support layer 300 shown in FIG. 10A and the formation of the constituent layer 310 shown in FIG. 10B, a stacked body of the three-dimensional shaped article is formed as shown in FIG. 10C.

Here, as shown in FIG. 10C, the stacked body of the three-dimensional shaped article of this embodiment has a cup-like shape (a state where a cup is inverted), and a portion surrounded by the constituent layer 310 forms a space S.

Then, finally, the stacked body of the three-dimensional shaped article formed as shown in FIG. 10C is heated in a thermostatic chamber (heating chamber) provided separately from the forming apparatus 2000 according to this embodiment (the constituent layer 310 is sintered into a sintered part 310'). Here, FIG. 10D shows a state where the stacked body of the three-dimensional shaped article is sintered.

In FIG. 10D, in the sintered part 310', the metal particles are sintered, and in the support layer 300' after heating, a portion 300a' corresponding to the first material 300a is decomposed and removed, and therefore disappears, and in a portion 300b' corresponding to the second material 300b, a sintered ceramic is left. That is, the first material 300a which is a portion of the support layer 300 is structurally changed, and the second material 300b which is a portion of the support layer 300 is not structurally changed.

Here, as apparent from the comparison of FIGS. 10C and 10D, when the constituent layer 310 is sintered, the volume decreases. On the other hand, in a portion corresponding to the space 5, a portion corresponding to the first material 300a is decomposed and removed, and therefore disappears, and therefore, the support layer 300 is configured such that the volume shrinkage ratio of the support layer 300 in the space S is higher than the shrinkage ratio of the stacked body of the three-dimensional shaped article.

In other words, in the three-dimensional shaped article production method, the support layer 300 is configured such that at least a portion which supports the constituent layer 310 in the space S includes a region (corresponding to the first material 300a) whose volume change accompanying the sintering step is relatively large and a region (corresponding to the second material 300b) whose volume change accompanying the sintering step is relatively small. Due to this, the shape of the support layer changes in response to the volume change (shrinkage) accompanying the sintering of the constituent layer effectively by the region whose volume change is relatively large, and the constituent layer during sintering can be supported efficiently by the region whose volume change is relatively small.

Incidentally, the "region whose volume change is relatively large and the region whose volume change is relatively small" are not particularly limited with respect to the difference thereof or the absolute amount thereof as long as the volume change ratio (shrinkage ratio) of the region whose volume change is large is larger than the volume change ratio (shrinkage ratio) of the region whose volume change is small, and also includes, for example, a case where there is substantially no volume change ratio (shrinkage ratio) in the region whose volume change is small as in the case of the portion 300b' corresponding to the second material 300b.

On the other hand, in the three-dimensional shaped article production method shown in FIGS. 7A to 7F, at least a portion of the support layer 300 which supports the constituent layer 310 in the space S is powdered (turned into a powder or particles) accompanying the sintering step. Due to this, after the sintering step, the sintered body of the three-dimensional shaped article can be easily taken out from the support layer 300 (the support layer can be easily removed from the sintered body of the three-dimensional shaped article).

Further, in either of the three-dimensional shaped article production method shown in FIGS. 7A to 7F and the three-dimensional shaped article production method shown in FIGS. 10A to 10D, at least a portion of the support layer 300 which supports the constituent layer 310 in the space S is volatilized accompanying the sintering step. Due to this, by performing a step of removing a gas containing the volatilized component during the sintering step or after the sintering step, the support layer 300 can be easily removed from the sintered body of the three-dimensional shaped article. In the case where there is a space closed by the constituent layer 310, the gas containing the volatilized component may be removed through the space among the particles in the process of sintering the particles contained in the constituent layer 310. Further, in the case where a three-dimensional shaped article in which at least a portion is porous is shaped, the gas containing the volatilized component may be removed through the space among the sintered particles after the sintering step.

The invention is not limited to the above-mentioned embodiments, but can be realized in various configurations without departing from the gist of the invention. For example, the technical features in the embodiments corresponding to the technical features in the respective forms described in "SUMMARY" may be appropriately replaced or combined in order to solve part or all of the problems described above or achieve part or all of the advantageous effects described above. Further, the technical features may be appropriately deleted unless they are described as essential features in the specification.

What is claimed is:

1. A method for producing a three-dimensional shaped article by stacking layers to form a stacked body, the method comprising:
    a constituent layer formation step of forming a constituent layer which correspond to a constituent region of the three-dimensional shaped article using a constituent material containing metal particles and a binder;
    a support layer formation step of forming a support layer that are in contact with the constituent layer and that support the constituent layer using a support layer forming material containing a binder;
    a stacking step of forming the stacked body by repeatedly performing the constituent layer formation step and the support layer formation step; and
    a sintering step of sintering the stacked body including the constituent layers and the support layers at the same time in a high-temperature chamber,
    wherein, a volume decrement of the support layers in the sintering step is higher than a volume decrement of the constituent layers in the sintering step,
    wherein, the support layer in a space, which is surrounded by the constituent layer in at least two directions, includes a first region and a second region, each of the first region and the second region having a volume change in the sintering step and a volume decrement of the first region is larger than a volume decrement of the second region in the sintering step with the first region of the support layer in the space being decomposed and removed, and is turned into a form of powder accompanying the sintering step, and the second region of the support layer having a honeycomb structure, a truss structure, or a lattice structure that is collapsed during the sintering step and remains within the space following decomposition and removal of the first region with the space is isotropically shrunk.

2. The method of claim 1, wherein the constituent layer shrinks during the sintering step and the support layer is configured, during the sintering step, to not hinder shrinkage of the constituent layer.

3. The method of claim 1, wherein the constituent layer is formed by ejecting the constituent material from a first nozzle in the form of a continuous body, and the support layer is formed by ejecting the support layer forming material from a second nozzle in the form of a continuous body.

4. The method of claim 1, wherein at least part of the support layer volatilizes accompanying the sintering step, and gases containing volatized components are removed through a space among particles contained the constituent layer in the sintering step.

5. The method of claim 1, further comprising formulating the constituent material having a first shrinkage ratio determined from a packing density of the metal particles; and formulating the support layer forming material containing ceramic particles and a binder, the support layer having a second shrinkage ratio determined from a packing density, wherein the second shrinkage ratio is greater than the first shrinkage ratio.

6. The method of claim 1, wherein the second region of the support layer contains ceramic particles, and the second region of the support layer is powdered accompanying the sintering step.

7. The method of claim 1, wherein the stacking step discharges the constituent material toward a stage and forms a closed space which perimeter is closed with the constituent layer and the stage, the support layer is formed in the closed space.

8. The method of claim 1, wherein the first region of the support layer contains resin and the second region of the support layer contains ceramic particles.

9. The method of claim 8, wherein the second region of the support layer is powdered accompanying the sintering step.

10. The method of claim 1, wherein the first region of the support layer and the second region of the support layer are alternately disposed in the space.

* * * * *